(12) United States Patent
Mundis

(10) Patent No.: US 7,140,994 B2
(45) Date of Patent: Nov. 28, 2006

(54) GEARBOX TORSIONAL LOAD SENSOR

(75) Inventor: James W. Mundis, Broken Arrow, OK (US)

(73) Assignee: Paccar Inc, Bellevue, WA (US)

( * ) Notice: Subject to any disclaimer, the term of this patent is extended or adjusted under 35 U.S.C. 154(b) by 169 days.

(21) Appl. No.: 10/872,222

(22) Filed: Jun. 18, 2004

(65) Prior Publication Data
US 2005/0282678 A1    Dec. 22, 2005

(51) Int. Cl.
G01L 3/14    (2006.01)
(52) U.S. Cl. ............................ 475/158; 73/862.195
(58) Field of Classification Search ............... 475/158, 475/257, 263, 264; 73/862.195
See application file for complete search history.

(56) References Cited

U.S. PATENT DOCUMENTS

| | | | |
|---|---|---|---|
| 1,869,513 A | 8/1932 | Seewald et al. | |
| 2,061,896 A | 11/1936 | Chilton | |
| 2,289,285 A * | 7/1942 | Chilton | 73/862.31 |
| 2,353,814 A * | 7/1944 | De Pew | 73/862.31 |
| 2,428,920 A * | 10/1947 | Ninnis et al. | 475/158 |
| 3,079,080 A | 2/1963 | Mason | |
| 3,108,471 A | 10/1963 | Buchele et al. | |
| 3,581,562 A | 6/1971 | Shorrock | |
| 3,823,607 A | 7/1974 | Rundell | |
| 3,881,347 A | 5/1975 | Buchele | |
| 4,013,174 A | 3/1977 | Morrow, Sr. et al. | |
| 4,176,548 A | 12/1979 | Cyphelly | |
| 4,456,093 A | 6/1984 | Finley et al. | |
| 4,754,652 A | 7/1988 | Coulter et al. | |
| 5,163,570 A | 11/1992 | Mundis et al. | |
| 5,711,730 A | 1/1998 | Friedman et al. | |
| 6,151,976 A * | 11/2000 | Inoue | 475/206 |
| 6,692,399 B1 * | 2/2004 | Larson et al. | 475/248 |
| 2004/0224811 A1* | 11/2004 | Vornehm et al. | 475/207 |
| 2005/0049103 A1* | 3/2005 | Pecnik et al. | 475/221 |

FOREIGN PATENT DOCUMENTS

| | | |
|---|---|---|
| EP | 1 249 693 A2 | 10/2002 |
| JP | 03042537 | 2/1991 |

\* cited by examiner

*Primary Examiner*—Sherry Estremsky
(74) *Attorney, Agent, or Firm*—Howison & Arnott, L.L.P.

(57) ABSTRACT

A planetary gearbox with transmitted torque sensor comprises a gear housing, first and second coupling members, sensing assembly, and planetary gears. The coupling members have axial faces disposed in a spaced apart, opposing relationship. Formed therein are a plurality of conical seats arranged in opposing pairs, each pair receiving a ball therebetween. The sensing assembly is positioned between the housing and at least one of the coupling members, urging the members toward one another and detecting relative axial movement. The planetary gears transmit torque from the second coupling member to a second gearbox shaft. The balls roll partway up the conical seats when transmitting torque between the coupling members, thereby causing the members to move axially away from one another a distance proportional to the torque transmitted. The distance is detected by the sensing assembly to indicate the torque transmitted by the unit.

27 Claims, 7 Drawing Sheets

GEARBOX TORSIONAL LOAD SENSOR

TECHNICAL FIELD OF THE INVENTION

The current invention relates generally to torque sensors for use in rotating machinery, and more particularly, to torque sensors for monitoring the torque transmitted by a mechanical gearbox or transmission such as a planetary swingdrive.

BACKGROUND OF THE INVENTION

A need has long been recognized to sense the torque loads transmitted by rotating machinery, especially machinery used in relatively low speed, high torque applications such as winches, gearboxes, swingdrives and the like. Often, the purpose of sensing the torque load is safety related, e.g., to prevent the overloading of some component of the equipment. For example, swingdrives are used on vehicles to horizontally rotate booms, platforms and the like. Overloads may be caused by swinging the boom when the vehicle is on sloped terrain, by striking an object to the side of the vehicle while articulating the boom, and when the boom, while extended to the side of the vehicle, is used to pull a load, either by forward movement of the vehicle or by continued articulation of the boom. By sensing the torque loads transmitted through the swingdrive or other machinery, loads on the boom can be monitored, either manually, i.e., by the operator, or automatically, i.e., by control equipment.

Various torque sensors for rotating machinery have been developed. Many of these sensors are made for laboratory use or precision measurements, and are not rugged enough to handle the full load of a heavy industrial gearbox. Other sensors use electrical brushes, electrical slip rings, radio frequency (RF) transmitters and the like to measure and indicate the torque being transmitted. Such component tend to be wear- or damage-prone when used in dirty, dusty, harsh environments often encountered by heavy equipment like winches or swing drives. Still other torque sensors have been made for specialized gearbox types, e.g., worm-gear drives, but are not readily adaptable to other gearbox types, e.g., planetary gear drives.

A need therefore exists, for a torque sensor that is rugged and well suited for use in heavy mechanical equipment such as hydraulic swingdrives, and further that is suited for use in different types of drives, including planetary gear drives.

SUMMARY OF THE INVENTION

The present invention disclosed and claimed herein comprises, in one aspect thereof, a planetary gearbox with transmitted torque sensor comprising a gear housing defining a longitudinal axis. A first coupling member is mounted in the gear housing for rotation about the longitudinal axis, the first coupling member having a first engaging portion adapted for receiving torque from a power source shaft, and having a first axial face substantially perpendicular to the longitudinal axis. A second coupling member is mounted in the gear housing for rotation about the longitudinal axis, the second coupling member having a second engaging portion adapted for transmitting torque to a first gearbox shaft, and having a second axial face substantially perpendicular to the longitudinal axis. The first and second axial faces are disposed in a spaced apart, opposing relationship to one another, and have a plurality of spaced apart conical seats provided therein arranged in opposing pairs. At least one of the coupling members is adapted for translation along the longitudinal axis relative to the other coupling member. A ball is disposed in each opposing pair of conical seats between the first coupling member and the second coupling member. A sensing assembly is positioned between the gear housing and at least one of coupling members, the sensing assembly urging at least one of the coupling members toward the other coupling member and detecting axial movement of the coupling members relative to one another. A primary sun gear is disposed on the first gearbox shaft for receiving torque therefrom. A primary annular ring gear is radially spaced apart from and encircles the primary sun gear. A primary planet carrier unit includes a carrier frame rotatable about the longitudinal axis, at least one planet gear simultaneously engaging the primary sun gear and the primary ring gear and being rotatably mounted on the carrier frame, and an engaging portion for transmitting torque to a second gearbox shaft. The balls roll partway up the conical seats when transmitting torque between the first and second coupling members, thereby causing the coupling members to move axially away from one another a distance substantially proportional to a torque transmitted between the power source shaft and the second gearbox shaft, the distance being detected by the sensing assembly as indicative of the torque transmitted.

The present invention disclosed and claimed herein comprises, in another aspect thereof, a gearbox with transmitted torque sensor comprising a housing defining a longitudinal axis. An input coupling member is mounted in the housing for rotation about the longitudinal axis, the input coupling member having a first engaging portion adapted for receiving torque from an input shaft, and having a first axial face. An output coupling member is mounted in the housing for rotation about the longitudinal axis, the output coupling member having a second engaging portion adapted for transmitting torque to a first gearbox shaft, and having a second axial face. The axial faces are disposed in a spaced apart, opposing relationship to one another, and have a plurality of spaced apart conical seats provided therein arranged in opposing pairs. At least one of the coupling members is adapted for translation along the longitudinal axis relative to the other coupling member. A ball is disposed in each opposing pair of conical seats between the input coupling member and the output coupling member. A sensing assembly is positioned between the housing and at least one of coupling members such that a longitudinal movement of the coupling members relative to one another produces a resulting movement in the sensing assembly. A first gear is disposed on the first gearbox shaft for receiving torque therefrom. A second gear operatively engages the first gear for receiving torque therefrom and transmitting torque to an output shaft. The balls roll partway up the conical seats when transmitting torque between the input and output coupling members, thereby causing the coupling members to move axially away from one another a distance substantially proportional to a torque transmitted between the input and output shafts. The torque transmitted is indicated by the resulting movement in the sensing assembly.

The present invention disclosed and claimed herein comprises, in a further aspect thereof, a torque sensor for sensing the torque transmitted by a gearbox. The sensor comprises a first coupling member for mounting in the gearbox for rotation about a longitudinal axis, having a first engaging portion adapted for receiving torque from an input shaft and having a first axial face. A second coupling member is for mounting in the gearbox for rotation about the longitudinal axis, has a second engaging portion adapted for transmitting torque to an output shaft and has a second axial face. The first and second axial faces are disposed in a spaced apart, opposing relationship to one another, and have a plurality of spaced apart conical seats provided therein arranged in opposing pairs. At least one of the coupling members is adapted for axial translation along the longitudinal axis relative to the other coupling member. A ball is disposed in each opposing pair of conical seats between the first coupling member and the second coupling member. A sensing assembly is operatively connected to only one of the coupling members, the sensing assembly urging the connected coupling member toward the other coupling member and detecting longitudinal movement of the connected coupling member relative to the other coupling member. The balls roll partway up the conical seats when transmitting torque between the first and second coupling members, thereby causing the coupling members to move longitudinally away from one another a distance substantially proportional to a torque transmitted between the input shaft and the output shaft. The distance is detected by the sensing assembly and is indicative of the torque transmitted.

The present invention disclosed and claimed herein comprises, in yet another aspect thereof, a load sensor for sensing a load on a boom mounted to a vehicle. It comprises a boom operatively coupled to a vehicle and a gear train for rotating the boom relative to the vehicle. The gear train includes an input coupling member for rotation about a longitudinal axis, the input coupling member having a first engaging portion adapted for receiving torque from a power source shaft, and having a first axial face. An output coupling member is included for rotation about the longitudinal axis, the output coupling member having a second engaging portion adapted for transmitting torque to a first gearbox shaft, and having a second axial face. The axial faces are disposed in a spaced apart, opposing relationship to one another, and having a plurality of spaced apart conical seats provided therein arranged in opposing pairs. At least one of the coupling members is adapted for translation along the longitudinal axis relative to the other coupling member. A ball is disposed in each opposing pair of conical seats between the input coupling member and the output coupling member. A gear set is provided for receiving the torque from the first gearbox shaft and transmitting the torque to the boom, and a gear housing is mounted to the vehicle for containing the gear train. The gear housing includes a sensing assembly positioned between a stationary portion of the gear housing and at least one of coupling members such that a longitudinal movement of the coupling members relative to one another produces a resulting movement in the sensing assembly. The balls roll partway up the conical seats while transmitting torque between the input and output coupling members, thereby causing the coupling members to move longitudinally away from one another a distance substantially proportional to a torque transmitted between the power source shaft and the boom. The distance of the resulting movement in the sensing assembly is indicative of the torque load on the boom.

BRIEF DESCRIPTION OF THE DRAWINGS

FIG. 3a illustrates the "NO TORQUE" configuration and FIG. 3b illustrates the "TORQUE APPLIED" configuration of the coupling members;

FIG. 5a is a partial cross-sectional front view taken along line 5a—5a of FIG. 5b, and FIG. 5b is a side view of the sensor;

DETAILED DESCRIPTION OF THE INVENTION

The current invention is described below in greater detail with reference to certain preferred embodiments illustrated in the accompanying drawings.

Figure 1:
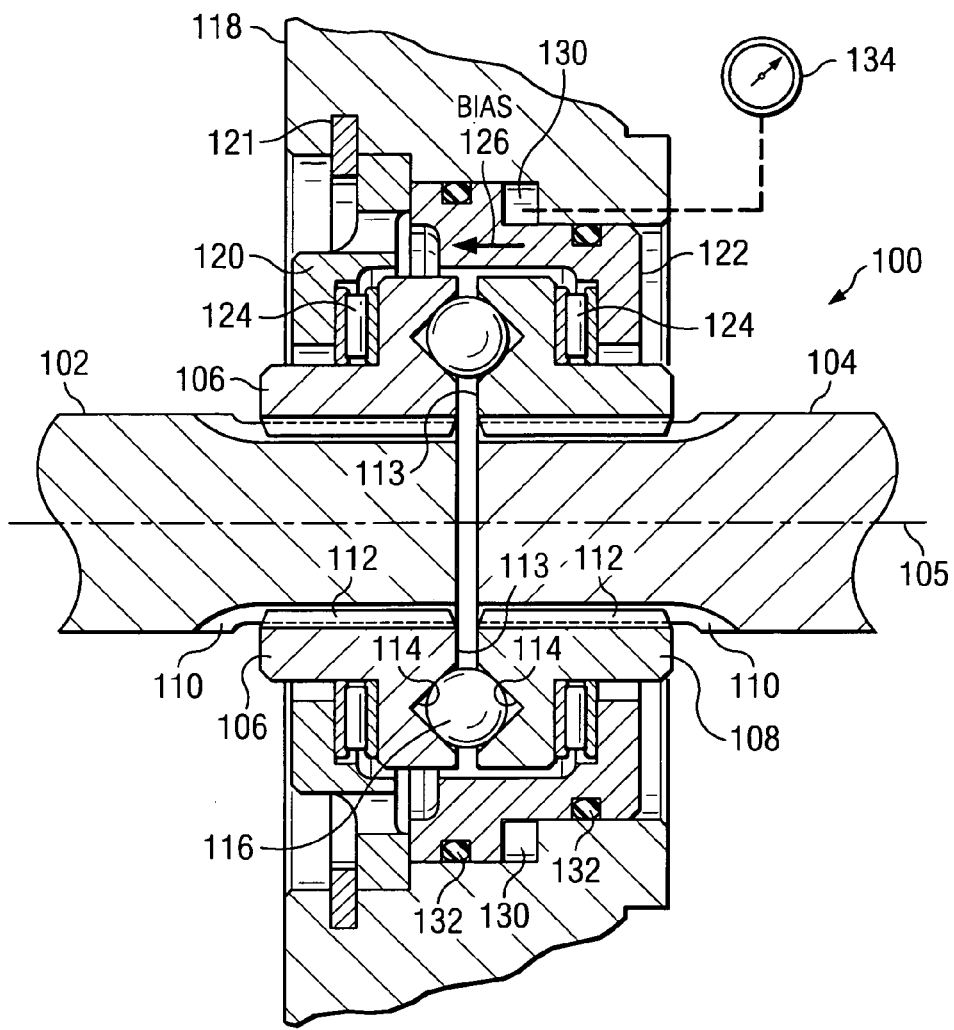
FIG. 1 is a side view of a torsional load sensor having a hydraulic load cell in accordance with one embodiment.

Referring now to FIG. 1, in one embodiment a torsional sensor coupling 100 joins first and second coaxial shafts 102 and 104 that rotate along longitudinal axis 105. The coupling 100 includes first and second coupling halves 106 and 108. Each coupling half 106 and 108 is provided with interior teeth 112 which engage exterior splines 110 on the respective shafts 102 and 104. This engagement allows the transfer of torque between each shaft and its respective coupling half, while at the same allowing each coupling half to move axially along the shaft (i.e., translate along the longitudinal axis 105).

Figure 2:
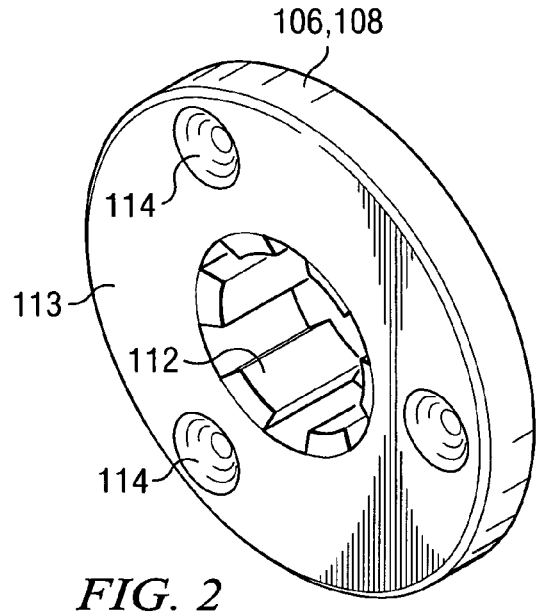
FIG. 2 is a perspective view of the face of one of the coupling members from the sensor of FIG. 1.

Referring now to FIG. 2, the adjacent axial faces 113 of each coupling half 106 and 108 include one or more matching cone-shaped depressions or seats 114. The depressions 114 are disposed in the same position on each coupling half. In the example illustrated, each coupling half includes three depressions 114, however, it will be appreciated that other numbers of depressions may be used in other embodiments.

Referring again to FIG. 1, the depressions 114 on the opposing axial faces of the two coupling halves 106 and 108 are aligned and a ball 116, typically made of hardened steel, is disposed within each opposing pair of depressions. The spacing between the adjacent axial faces 113 of the coupling halves and the maximum allowable amount of axial movement is selected to insure that each ball 116 remains trapped between the two couplings halves. A fixed frame 118, typically part of a gear housing or similar structure, positions an annular stop member 120 and an annular piston member 122 against the exterior axial faces of the coupling halves 106 and 108 via needle bearings 124 to allow relative rotation. The stop member 120 is held in fixed position by a retaining ring 121 installed in a groove on frame 118. The piston 122 is hydraulically biased in the direction indicated by arrow 126, thus urging the coupling halves 106 and 108 towards one an other, and urging the balls 116 to center themselves in the depressions 114.

Figure 3A:
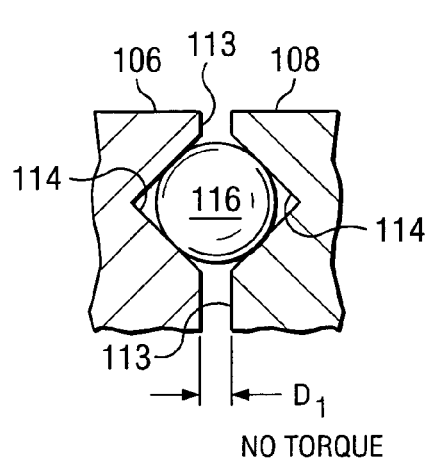
FIGS. 3a and 3b are partial cross-sectional side views of the interface between the coupling members of FIG. 1. Specifically.
Figure 3B:
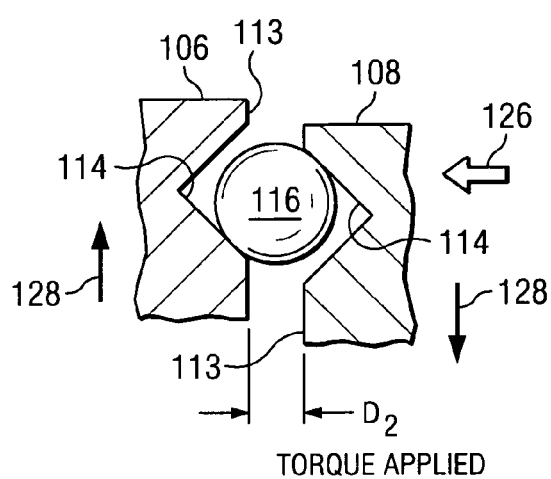

FIGS. 3a and 3b show enlarged cross-sectional views of the coupling halves 106 and 108 in the region of a ball 116 trapped in paired depressions 114 to illustrate the operation of the torque sensor. FIG. 3a shows the "NO TORQUE" configuration, while FIG. 3b shows the "TORQUE APPLIED" configuration. When the coupling 100 is transmitting no torque (FIG. 3a), the coupling halves 106 and 108 will be stationary with respect to one another (regardless of whether the coupling as a whole is stationary or rotating), the ball 116 will be centered in the depressions 114, and the adjacent axial faces 113 of the coupling halves will be separated by a minimum distance denoted by $D_1$. When the coupling 100 is transmitting a torque (FIG. 3b), the coupling halves 106 and 108 will rotate slightly with respect to one another as shown by arrow 128 (regardless whether they are rotating with respect to the frame), causing the ball 116 to roll partway up the inclined sides of the depressions 114, and thereby forcing the coupling halves 106 and 108 axially apart against the bias 126 of the piston (not shown) until the axial faces 113 of the coupling halves are a distance $D_2$, apart. The resulting movement, i.e., the change in coupler spacing $D_2$-$D_1$, is generally proportional to the amount of torque transmitted between the shafts 102 and 104 by the coupling 100.

Referring again to FIG. 1, as the coupling halves 106 and 108 move apart due to the transmitted torque, the piston 122 moves axially against the bias 126. An annular hydraulic chamber 130 is provided between the frame 118 and piston 122, maintained by seals 132. The hydraulic chamber 130 is filled with pressurized hydraulic fluid that has been bled to remove any air. This pressurized fluid provides the bias to the piston 122, and further serves as a working fluid for the torque sensor. Typically, the hydraulic fluid in the chamber 130 is pressurized to a base level within the range of about 10% to about 30% of the maximum pressure. For example, if the maximum chamber pressure of the sensor (i.e., when sensing maximum torque) is 1000 psi, then the base chamber pressure (i.e., when sensing no torque) will be within the range of about 100 psi to about 300 psi. The base pressurization of the fluid ensures that the seals 132 are well seated, and that the piston 122 can overcome any seal friction to reach its fully extended position. As the torque transmitted by coupling 100 increases, the coupling half 108 moves further against the hydraulic bias 126, thereby forcing the piston 122 to move relative to the frame 118, and further compressing the fluid in hydraulic chamber 130. Accordingly, by measuring the pressure of the hydraulic fluid in the hydraulic chamber 130, the torque transmitted between the shafts 102 and 104 by the coupling 100 can be determined. The measurement can be made by a hydraulic pressure gauge 134 or a pressure transducer of conventional design. Signals from the gauge 134 or transducer may be displayed to the operator, e.g., by means of a properly calibrated display, or they can be used as inputs to a drive control system or torque limiting system.

Figure 4:
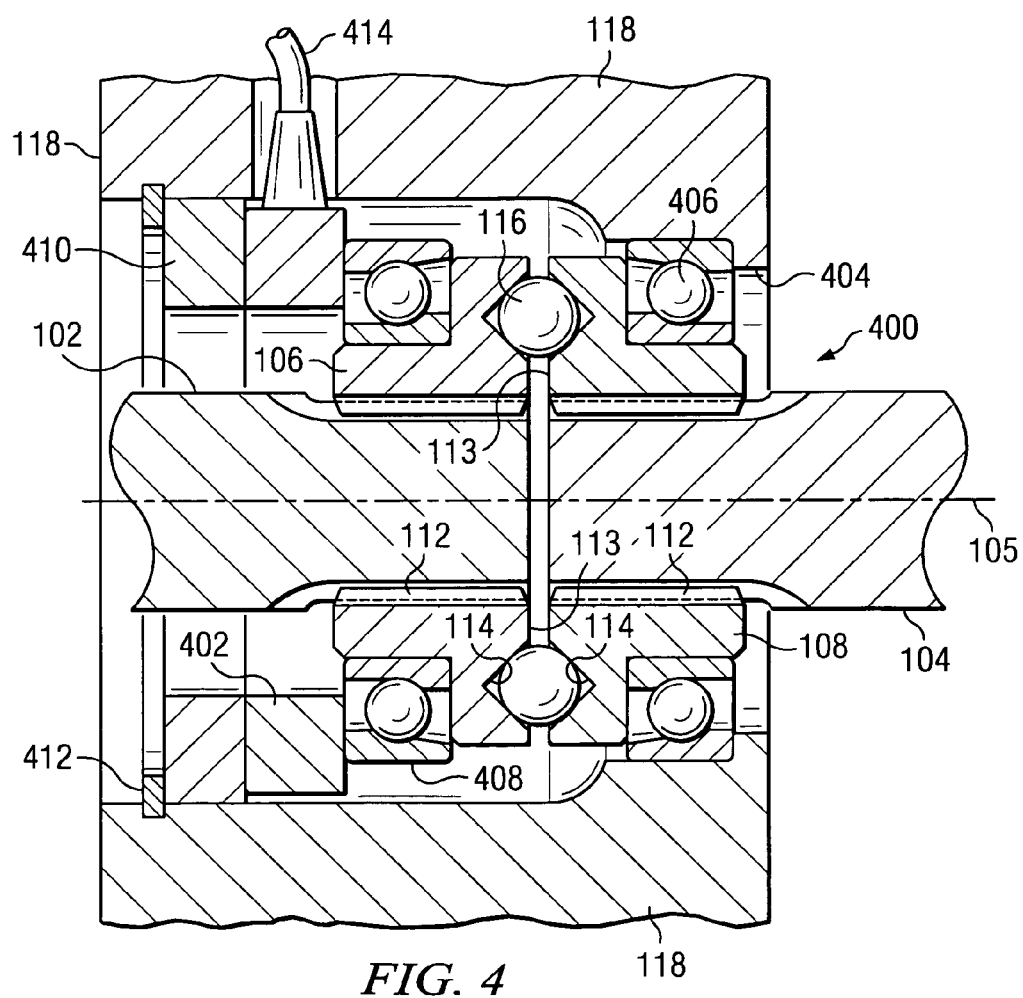
FIG. 4 is a side view of a torsional load sensor having an electrical strain gauge load cell in accordance with another embodiment.

Referring now to FIG. 4, there is illustrated an alternative embodiment. The alternative coupling 400 includes coupling halves 106 and 108, which are substantially similar to those previously described, with engaging portions 112, axially opposing faces 113 and a plurality of depressions 114. As in the previous embodiment, balls 116 are captured in each opposing pair of depressions 114. However, unlike the previous embodiment, axial movement of the coupling halves 106 and 108 resulting from transmitted torque causes the coupling half 106 to press against an electronic load cell 402 as the torque increases, rather than against a hydraulic piston. In this case, the coupling half 108 is constrained from axial movement to the right by projection 404 (via ball bearings 406) of frame 118. Thus, when the transmitted torque forces the coupling halves axially apart, the coupling half 106 moves left against the load sensor 402 (via ball bearings 408). The load sensor 402 is constrained against axial movement to the left by a retainer ring 410 secured by a snap ring 412, thus axial movement of the coupling half 106 causes axial deformation of the load cell 402. This deformation is detected electrically and produces an electrical signal proportional to the torque that is sent via wire 414 to a control unit or display (not shown). In the embodiment shown, the load cell 402 is an annular electronic strain gauge (i.e., "donut") load cell of conventional type, but other types of electronic load cells may be used as long as the cell's deformation can be calibrated to reflect axial movement. It will be noted that the use of ball bearings 406 and 408 in this embodiment allow operation at higher rotational speeds than the roller thrust bearings of previous embodiments, and the use of the electronic load cell in the torque sensor eliminates the frictional losses attributable to the hydraulic seals. These performance enhancing features may be utilized in any of the embodiments shown herein if deemed necessary for the particular application.

It will be appreciated that, regardless of whether hydraulic or electronic load detection is used, the relative axial travel of the coupling halves 106 and 108 will typically be very small. For example tests have demonstrated reliable torque sensing with only 0.060 inches of maximum relative movement between the axial coupling faces 113 of the coupling halves. Limiting the relative movement between the coupling halves 106 and 108 is also necessary to prevent the balls 116 from rolling completely out of the depressions 114, which would cause the loss of all torque transfer ability and failure of the unit.

Figure 5A:
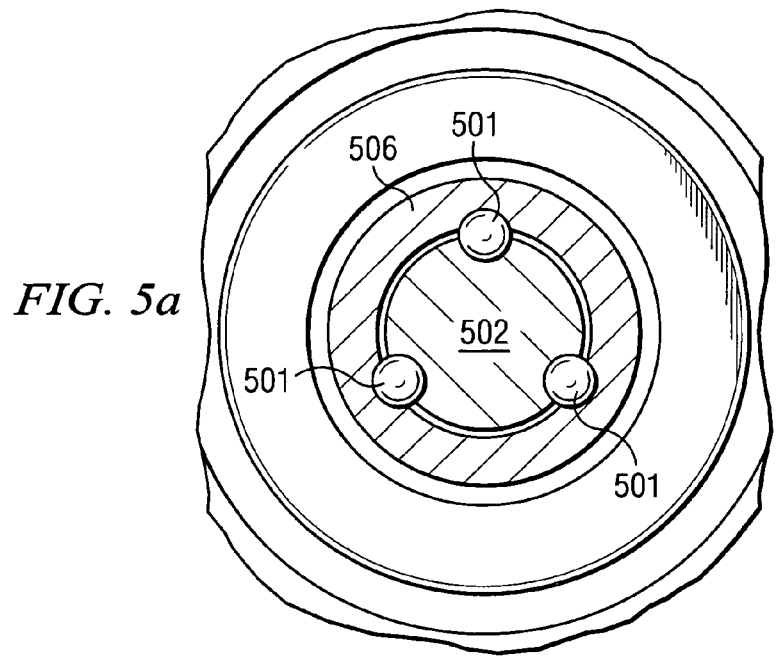
FIGS. 5a and 5b show a torsional load sensor having a ball spline coupling in accordance with a further embodiment. Specifically.
Figure 5B:
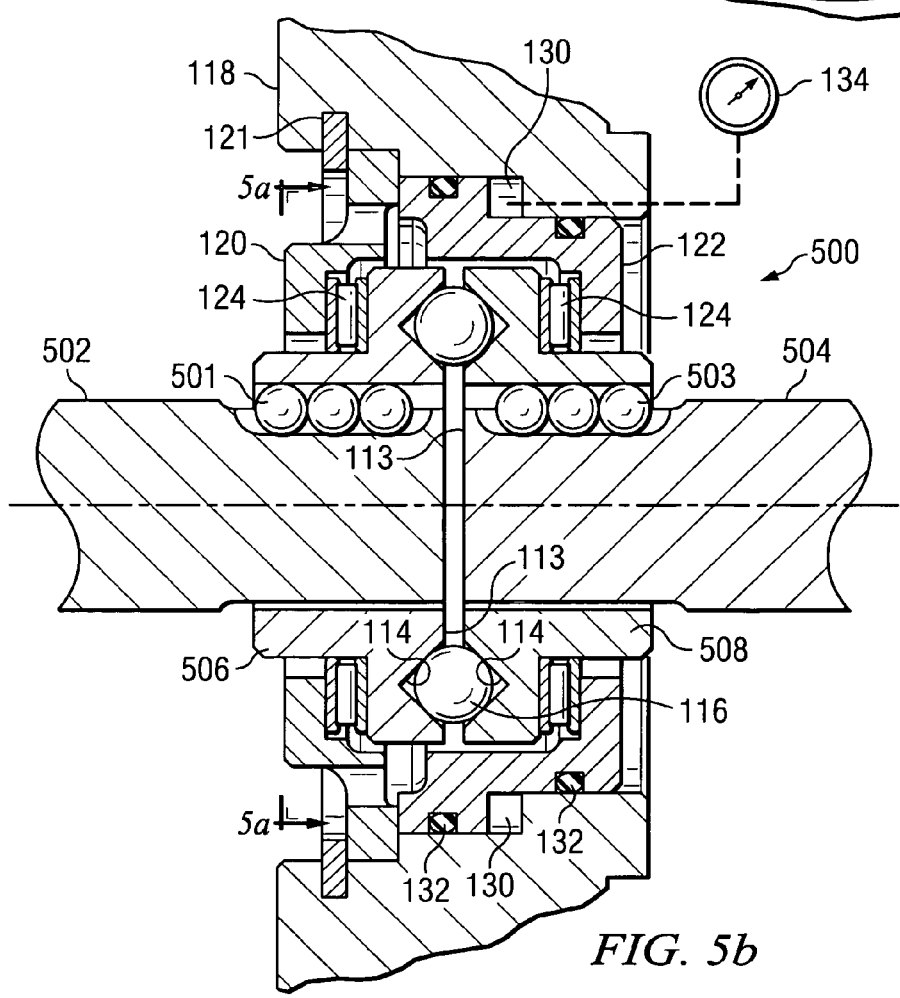

Referring now to FIGS. 5a and 5b, there is illustrated another alternative embodiment. Alternative coupling 500 has engaging portions that include ball splines 501 and 503 to transmit torque between the shafts 502 and 504 and their respective coupling halves 506 and 508. The ball splines 501 and 503 transmit torque without significant loss while allowing the shafts 502 and 504 to move axially relative to the coupling halves 506 and 508 with very little friction. This frictional reduction increases the accuracy of the torque measurement by reducing the influence of the shafts' movement on the coupling halves' movement. In most other respects, the alternative coupling 500 is similar in structure and operation to the sensor couplings previously described. The coupling 500 shown utilizes a hydraulic piston arrangement similar to that of FIG. 1 for torque measurement. Alternatively, an electronic load sensor arrangement similar to that of FIG. 4 could be used. As yet another alternative, the conventional elastomer o-ring seals of the torque sensor piston may be replaced by low-friction seals made of Teflon® (i.e., polytetrafluoroethylene or "PTFE") material to further reduce frictional losses associated with piston movement and increase the accuracy of the torque measurements.

Figure 6:
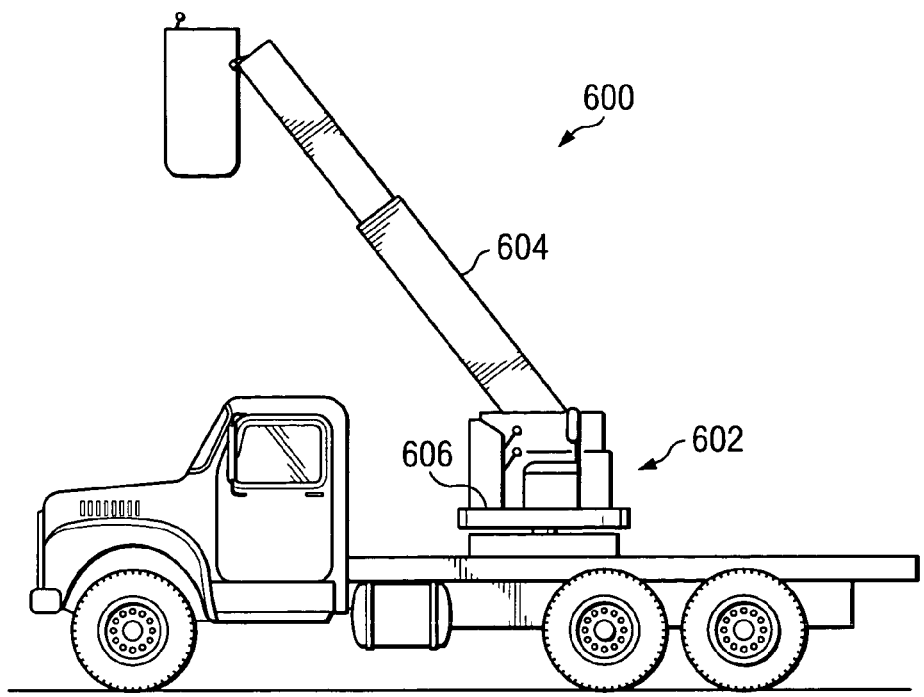
FIG. 6 is a side elevation view of a vehicle having a rotating boom system in accordance with yet another embodiment.

Referring now to FIG. 6, there is illustrated a vehicle of the type which may incorporate the current invention. The vehicle 600 includes a lifting device 602 with a boom 604 for hoisting or lifting some type of load. The lifting mechanism 602 is mounted on a turret 606, which rotates the lifting device and boom 604 relative to the vehicle 600 to position the boom at a desired location about the vehicle. The vehicle illustrated in FIG. 6 is a so-called "cherry picker," but it is understood that the present invention could be used in any type of crane or utility vehicle that involves swinging or rotating large structures which expose the drive equipment to large torques.

Figure 7:
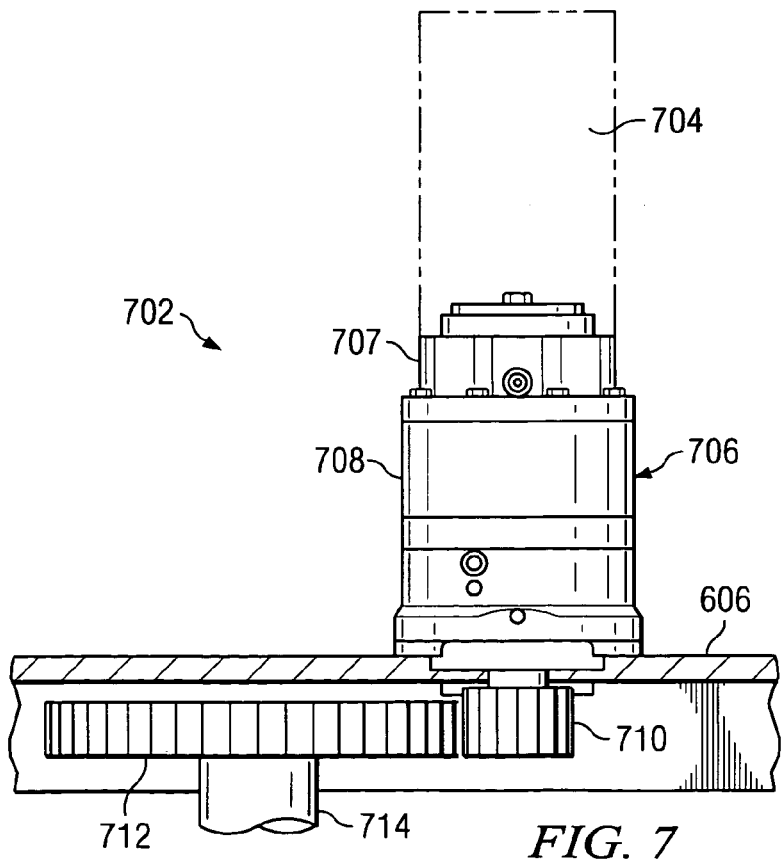
FIG. 7 is a side elevation view, in partial cross section, of the swing drive system for the vehicle of FIG. 6.

Referring now to FIG. 7, there is illustrated a typical swing drive for the turret 606 of the lifting vehicle 600. The swing drive 702 includes a gear housing 706 mounted to the top deck of the turret 606. The gear housing 706 is adapted to mount a drive motor 704 (shown in phantom) for supplying input power to the drive. The motor 704 may be a hydraulic motor, electric motor, or other motor suitable for providing the necessary torque and power required. The gear housing 706 typically includes an input portion 707, which contains the torque sensor and (possibly) a brake assembly (not shown), and a transmission portion 708, which contains the drive gears (not shown). A pinion gear 710 extends from the lower end of the gear housing 706. A pinion gear 710 operably engages a circular rack 712 rigidly attached to the vehicle 600 by a shaft 714 such that when a torque is supplied by the pinion gear to the rack, the turret 606 rotates relative to the vehicle.

Figure 8:
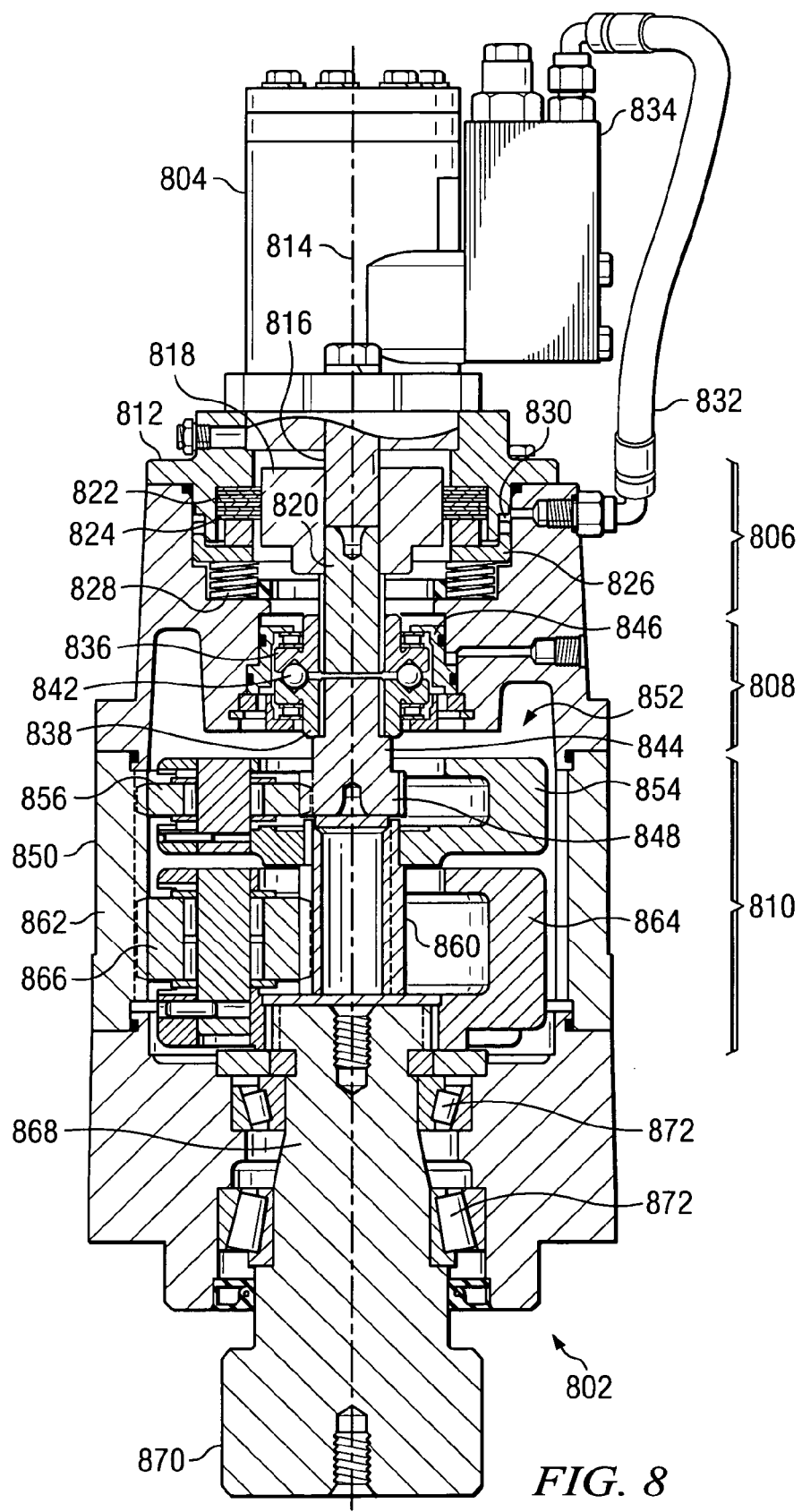
FIG. 8 is a side cross-sectional view of a sensor-equipped planetary gear drive with a hydraulic motor attached.

Referring now to FIG. 8, there is shown a cross-sectional view of another swing drive 800 to further illustrate various aspects of the invention. The swing drive 802 of this embodiment includes a hydraulic motor 804, a hydraulic brake assembly 806, a torque sensor with hydraulic load cell 808, and a two-stage planetary transmission 810. The hydraulic motor 804 is mounted on the upper end of a gear housing 812, which defines a longitudinal axis 814. The motor 804 delivers input torque via a motor shaft 816. A brake hub 818 is rotatably mounted in the gear housing 812 and engages the motor shaft 816 to receive torque therefrom. The brake hub 818 also engages the input shaft 820 of the torque sensor to transfer torque thereto. An outer portion of the brake hub 818 is adapted to engage a plurality of friction disks 822, which rotate with the brake hub but do not engage the housing 812. Interleaved with the friction disks 822 are a plurality of brake plates 824, which are engaged with a fixed portion of the housing 812, but not with the brake hub 818. A brake piston 826 is slidably mounted in the housing 812, and biased to press against the friction disks 822 and brake plates 824 by a set of brake springs 828. When the brake piston 826 is activated by the springs 828, friction between the friction disks 822 and brake plates 824 prevents movement of the brake hub 818 relative to the housing 812, thereby locking the drive in place. The brake piston 826 can be hydraulically released by applying pressure to an annular hydraulic chamber 830 disposed adjacent to the piston. In the example shown, the brake is released by hydraulic fluid received from hose 832 and control unit 834.

The input shaft 820 transmits torque from the brake hub 818 to the torque sensor assembly 808, which is generally similar in construction and operation to those previously described. The torque sensor assembly includes a first coupling member 836 that is rotatably mounted in the housing 812 for rotation about the longitudinal axis 814 and engages the input shaft 820 to receive torque therefrom. A second coupling member 838 is rotatably mounted in the housing adjacent to the first coupling member for rotation along the longitudinal axis. Each of the coupling members has an axial face which is substantially perpendicular to the longitudinal axis. The first and second axial faces are disposed in a spaced apart, opposing relationship to one another, and have a plurality of spaced apart conical depressions or seats 840 provided therein arranged in opposing pairs. A ball 842 is disposed in each opposing pair of conical seats 840 between the first coupling member 836 and the second coupling member 838. At least one of the first and second coupling members is adapted for translation along the longitudinal axis 814 relative to the other coupling member. The second coupling member has an engagement portion which is adapted to transmit torque to a first gearbox shaft 844.

A sensing assembly is positioned between the gear housing 812 and at least one of the coupling members 836 and 838. In the illustrated example, the sensing assembly is a hydraulic load cell 846 similar in construction and operation to those described in connection with FIG. 1 and FIGS. 5a and 5b. When torque is transmitted between the first and second coupling members 836 and 838, the balls 842 will roll partway up the conical seats 840, thereby causing the coupling members to move axially away from one another a distance that is substantially proportional to the torque transmitted. The axial movement between the two coupling members is detected by the sensing assembly 846 as indicative of the torque transmitted from one coupling member to the other. In this case, axial movement between the coupling members 836 and 838 causes resulting movement of a hydraulic piston, which in turn changes the pressure of fluid in an adjacent hydraulic chamber. This pressure is sensed as being indicative of the torque transmitted.

Having now been sensed by the torque sensor 846, the torque is transmitted from the sensor assembly section 808 to the transmission section 810 via a primary sun gear 848 disposed on the first gearbox shaft 844. In addition to the primary sun gear 848, the first stage of planetary gears comprises a primary annular ring gear 850 and a primary carrier unit 852, which may be of conventional design. In other words, the primary annular ring gear 850 is radially spaced apart from and encircles the primary sun gear 848. The primary carrier unit 852 includes a carrier frame 854 that is rotatable about the longitudinal axis 814, and at least one planet gear 856 that is rotatably mounted on the carrier frame 854 and simultaneously engages the primary sun gear 848 and the primary ring gear 850. An engaging portion is provided on the carrier frame 854 for transmitting torque to a second gearbox shaft 860 (top end). The second stage of planetary gears has a similar configuration, including a secondary sun gear 860 (bottom end) attached to the second gearbox shaft, a secondary annular ring gear 862, and a secondary carrier unit 864 including one or more secondary planet gears 866. In the illustrated example, a single toothed shaft, designated 860, serves as the second gearbox shaft (engaging the primary carrier frame 854) at one end and as the secondary sun gear (engaging the secondary planet gears 866) at the other end, but these may be separate elements in other embodiments. The secondary carrier unit 864 has an engagement portion that transmits torque to the output pinion shaft 868 and thus to the output pinion gear 870. Preferably, large roller bearings 872 are provided in the lower portion of the housing 812 to support the pinion shaft 868 in view of the high loads involved in moving a boom or other large assembly located on the turret.

It will be appreciated that in the example shown, separate elements of the apparatus may be produced as different portions of a single, integrally formed component. It has already been described that different portions of a single toothed shaft 860 may serves as both the second gearbox shaft and as the secondary sun gear. In another example, the primary and secondary annular ring gears, 850 and 862 respectively, may be separate components in some embodiments, but in this example they are merely portions of a common annular ring gear having a uniform tooth count and pitch diameter. Such configurations may have significant advantages in terms of ease of manufacture and/or assembly.

Figure 9:
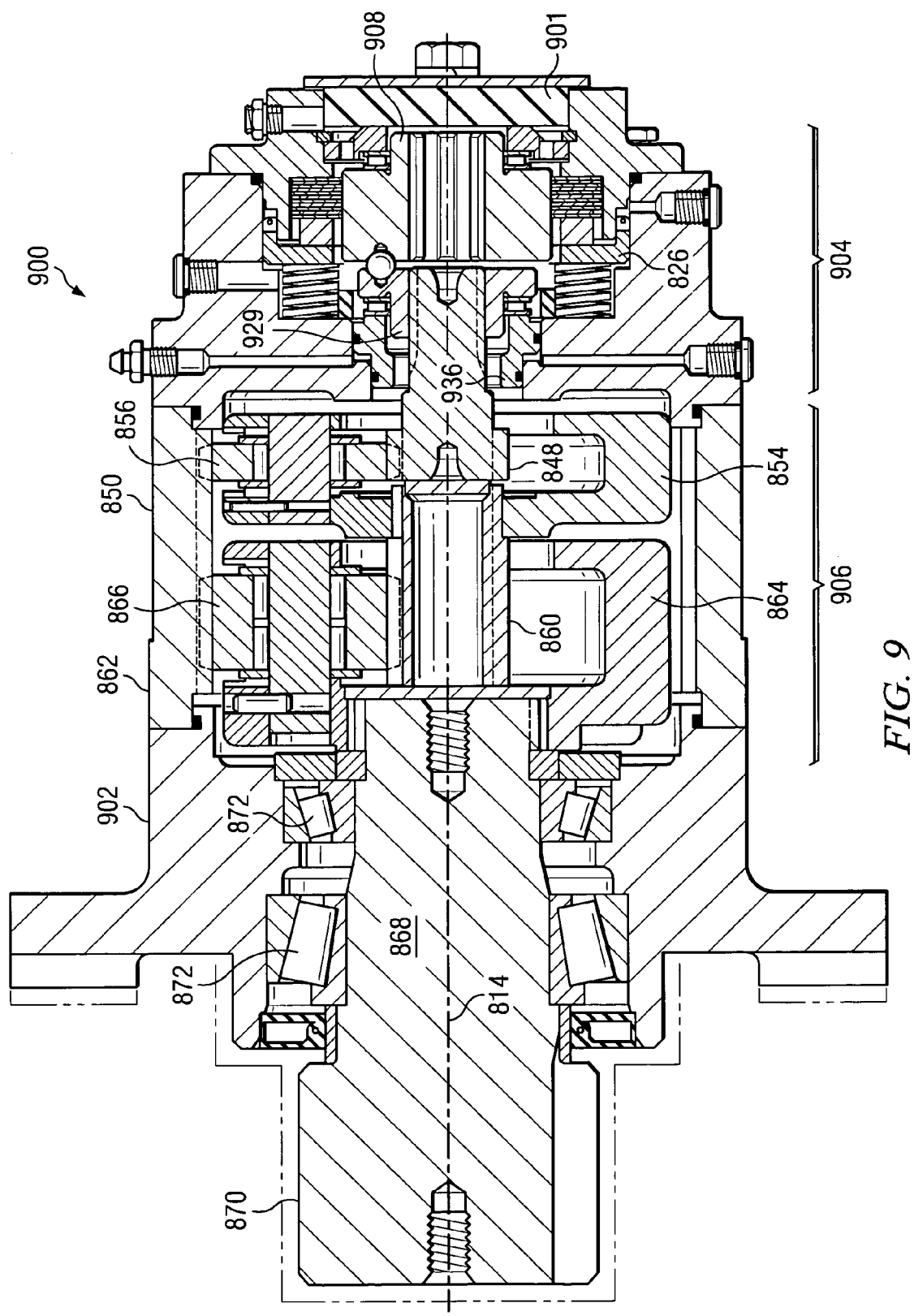
FIG. 9 is a side cross-sectional view of a planetary gear drive incorporating a torque sensor in accordance with another embodiment.
Figure 10:
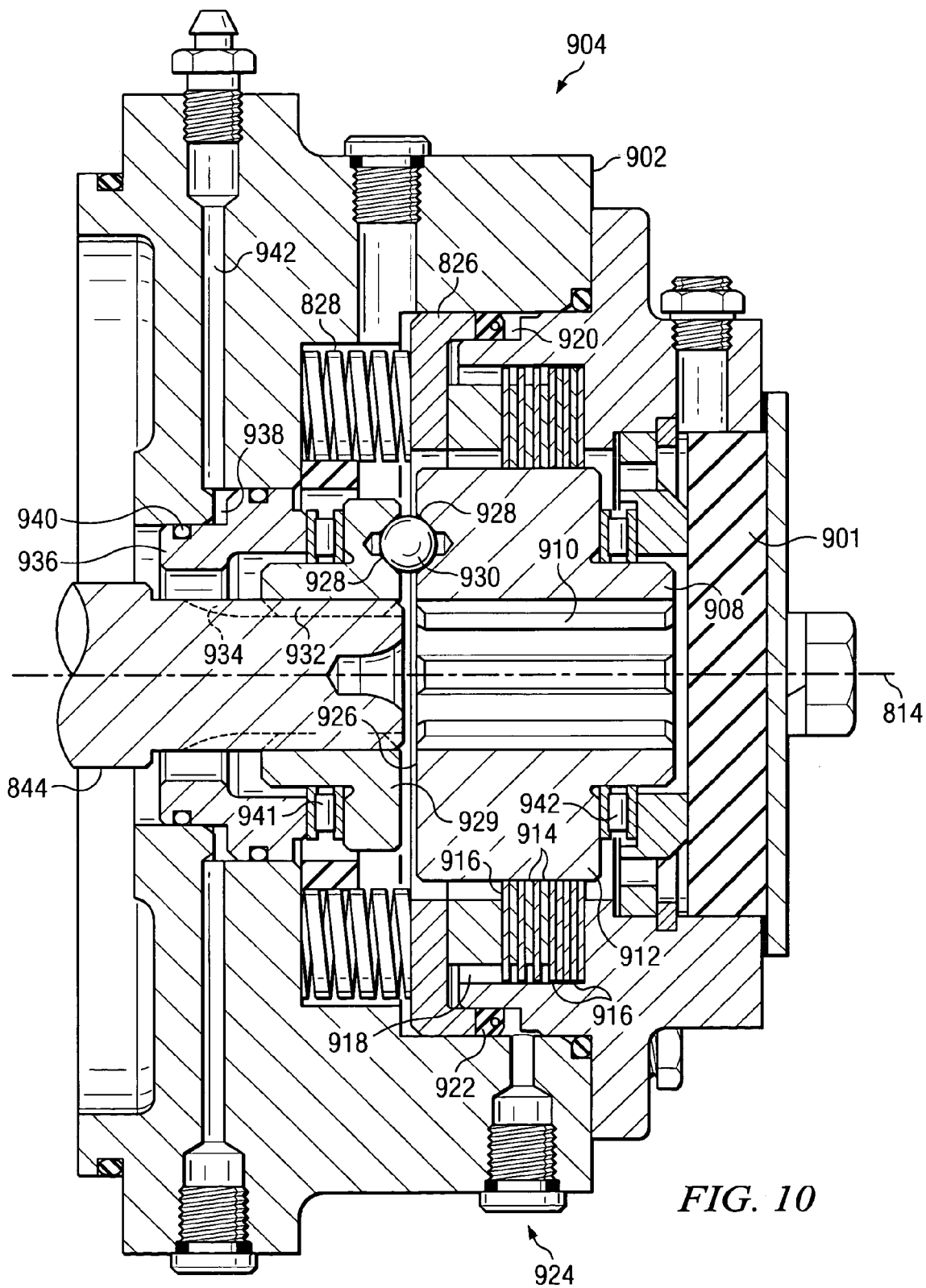
FIG. 10 is an enlarged side cross-sectional of a portion of the gear drive of FIG. 9.

Referring now to FIGS. 9 and 10, there is shown another alternative swing drive unit. The swing drive unit 900 is similar in many respects to the drive unit described in connection with FIG. 8, however, the drive 900 has an integrated brake and torque sensor assembly that yields a more compact arrangement.

Referring first to FIG. 9, the entire drive 900 is shown as it might be supplied by a drive manufacturer to a vehicle manufacturer. Note that the hydraulic motor is not installed, as this is typically supplied by the vehicle manufacturer. Instead, a blank plate 901 is installed over the motor mounting section of the drive. The drive unit 900 includes a gear housing 902 including an input section 904 enclosing the combined brake/torque sensor assembly and a transmission section 906 enclosing a two-stage planetary gear drive. Many of the components of the drive unit 900 are substantially identical in configuration and operation to those of the previous embodiment. Such components are designated by using the same reference numbers as before and their descriptions are not repeated.

Referring now also to FIG. 10, there is shown an enlarged cross-section of the input section 904 to further illustrate this embodiment. In this embodiment, the separate first coupling member and brake hub of previous embodiments have been combined into a single input coupling member 908. The first coupling member 908 has an engaging portion adapted to receive torque from a power source shaft. In this case, the engaging portion of input coupling member 908 comprises an internal toothed spline 910 adapted to engage the output shaft of the motor (not shown). A brake engaging portion 912 is also provided on the input coupling member 908. The brake engaging portion 912 engages a plurality of friction disks 914 such that the friction disks are circumferentially locked to the input coupling member but free to slide longitudinally. In this case, the brake engaging portion 912 comprises external splines which engage internal teeth on the friction disks 914. A plurality of annular brake plates 916 are interleaved with the friction disks 914. The brake plates 916 are circumferentially locked to a stationary portion 918 of the gear housing 902, but are free to slide longitudinally. In this case, the stationary portion of the housing has internal splines which engage external teeth on the brake plates 916. A brake piston 826 is slidably mounted in the housing 902 and biased against the plates 916 by brake springs 828. When this bias is unopposed, the brake plates 916 are compressed against the friction disks 914, engaging the brake to lock the coupling member 908 to the housing 902 and thereby preventing rotation of the coupling member and the shafts engaged by it. The brake piston 826 interfits with the housing 902 to form a hydraulic cavity 920 that is sealed with seals 922. Hydraulic fluid may be introduced into the cavity 920 via port 924 to move the piston 826 against the spring bias, thereby releasing the brake and allowing the input coupling member 908 to rotate once more.

The input coupling member 908 includes an axial face 926 that has a plurality of conical seats or depressions 928 formed therein, similar to the coupling members in previous embodiments. A second coupling member 929, also having an axial face 926 with a plurality of conical seats 928 formed therein, is also mounted in the housing 902 for rotation along the longitudinal axis 814. The axial faces 926 of the input coupling member 908 and the second coupling member 929 are disposed in a spaced apart, opposing relationship to one another. As in the previous embodiments, a ball 930 is disposed in each opposing pair of conical seats 928 between the input coupling member and the second coupling member. The second coupling member 929 includes an engaging portion for transmitting torque to a first gearbox shaft 844. In the example shown, the engaging portion includes internal teeth 932 which engage splines 934 formed on the first gearbox shaft. This arrangement allows translation of the second coupling member 929 along the longitudinal axis 814 relative to the input coupling member 908. Ideally, there will be minimal interaction between the longitudinal translation of the first gearbox shaft 844 (e.g., caused by loads in the gearbox section) and longitudinal translation of the second coupling member 929 (e.g., resulting from changes in the amount of torque transmitted through the coupling), so that the torque measurement will be as accurate as possible.

The hydraulic load cell of the current embodiment includes a piston 936 slidably mounted in the housing 902 and interfitting so as to form a hydraulic sensor cavity 938 sealed by seals 940. The hydraulic sensor cavity 938 is filled with pressurized hydraulic fluid via port 942, which biases the piston 936 against the second coupling half 929 via needle bearings 941. When torque is transmitted between the coupling members 908 and 929, the balls 930 roll partway up the conical seats 928 forcing the coupling members to move axially away from one another. However, the input coupling member 908 is prevented from moving axially away from the second coupling member 929 by needle bearings 942 that bear against a fixed portion of housing 902. Therefore, the second coupling member 929 is forced to move longitudinally against the bias of the hydraulic fluid in a direction away from the input coupling member 908. This resulting axial movement of the coupling member 929 also causes the piston 936 to move, thus changing the hydraulic pressure in the hydraulic sensing cavity 938 in a manner indicative of the torque transmitted by the coupling. This pressure can be sensed through port 942 and calibrated to the torque transmitted. The sensed pressure can then be displayed to the operator or used as an input to an automatic load control system.

Referring again to FIG. 9, the torque received by the second coupling member 929 is next transferred to the first gearbox shaft 844 for passing to the transmission section 906 of the drive as previously described. In the embodiment shown, the transmission section 906 comprises a two stage set of planetary gears, however, it will be appreciated that other types of gears, e.g., spur gears or helical gears may be used in the transmission section in addition to, or instead of, the planetary gears shown herein.

While the invention has been shown or described in a variety of its forms, it should be apparent to those skilled in the art that it is not limited to these embodiments, but is susceptible to various changes without departing from the scope of the invention.

What is claimed is:

1. A planetary gearbox with transmitted torque sensor comprising:
   a gear housing defining a longitudinal axis;
   a first coupling member mounted in the gear housing for rotation about the longitudinal axis, the first coupling member having a first engaging portion adapted for receiving torque from a power source shaft, and having a first axial face substantially perpendicular to the longitudinal axis;
   a second coupling member mounted in the gear housing for rotation about the longitudinal axis, the second coupling member having a second engaging portion adapted for transmitting torque to a first gearbox shaft, and having a second axial face substantially perpendicular to the longitudinal axis;
   the first and second axial faces being disposed in a spaced apart, opposing relationship to one another, and having a plurality of spaced apart conical seats provided therein arranged in opposing pairs;

at least one of the coupling members being adapted for translation along the longitudinal axis relative to the other coupling member;

a ball disposed in each opposing pair of conical seats between the first coupling member and the second coupling member;

a sensing assembly positioned between the gear housing and at least one of coupling members, the sensing assembly urging at least one of the coupling members toward the other coupling member and detecting axial movement of the coupling members relative to one another;

a primary sun gear disposed on the first gearbox shaft for receiving torque therefrom;

a primary annular ring gear radially spaced apart from and encircling the primary sun gear; and a primary planet carrier unit including a carrier frame rotatable about the longitudinal axis, at least one planet gear simultaneously engaging the primary sun gear and the primary ring gear and rotatably mounted on the carrier frame, and an engaging portion for transmitting torque to a second gearbox shaft;

wherein the balls roll partway up the conical seats when transmitting torque between the first and second coupling members, thereby causing the coupling members to move axially away from one another a distance substantially proportional to a torque transmitted between the power source shaft and the second gearbox shaft, the distance being detected by the sensing assembly as indicative of the torque transmitted.

2. A planetary gearbox in accordance with claim 1, further comprising:

a secondary sun gear disposed on the second gearbox shaft for receiving torque therefrom;

a secondary annular ring gear radially spaced apart from and encircling the secondary sun gear; and a secondary planet carrier unit including a carrier frame rotatable about the longitudinal axis, at least one planet gear simultaneously engaging the secondary sun gear and the secondary ring gear and rotatably mounted on the carrier frame, and an engaging portion for transmitting torque to a third gearbox shaft.

3. A planetary gearbox in accordance with claim 2, wherein the third gearbox shaft is an output shaft including an output pinion.

4. A planetary gearbox in accordance with claim 2, wherein the first and second annular ring gears are portions of a common annular ring gear having a uniform tooth count and pitch diameter.

5. A planetary gearbox in accordance with claim 1, wherein at least one of the first and second engaging portions comprises longitudinal ball splines including a plurality of balls and correspondingly shaped longitudinal splines for reducing friction when the respective coupling member moves in the longitudinal direction.

6. A planetary gearbox in accordance with claim 1, wherein the sensing assembly further comprises:

a sensing piston slidably mounted in the gear housing and interfitting with a stationary portion of the gear housing to form a cavity therebetween, the cavity having a volume that varies according to the position of the sensing piston;

a quantity of hydraulic fluid contained within the cavity, the pressure of the hydraulic fluid changing according to the volume of the cavity;

a pressure sensor operably connected to the cavity for measuring the pressure of the hydraulic fluid; and wherein the pressure of the hydraulic fluid urges the sensing piston toward one of the coupling members, and relative axial movement of the coupling members with respect to one another results in a corresponding movement of the sensing piston that can be detected by the pressure sensor to indicate transmitted torque.

7. A planetary gearbox in accordance with claim 6, wherein the sensor piston has an annular configuration and the cavity formed between the sensor piston and the gear housing is an annular cavity encircling the longitudinal axis.

8. A planetary gearbox in accordance with claim 1, wherein the sensing assembly further comprises:

a load transfer member slidably mounted in the gear housing between a fixed portion of the gear housing and one of the coupling members, the load transfer member moving in response to longitudinal movement of the coupling members with respect to one another;

a load cell mounted between the fixed portion of the gear housing and the load transfer member, the load cell being deformed by movement of the load transfer member and producing an electrical signal indicative of the magnitude of the movement;

wherein the load cell urges the load transfer member toward one of the coupling members, and relative axial movement of the coupling members with respect to one another results in a corresponding movement of the load transfer member that can be detected by the load cell to indicate transmitted torque.

9. A planetary gearbox in accordance with claim 8, wherein the load cell is an annular strain gauge load cell.

10. A planetary gearbox in accordance with claim 1, further comprising:

a brake engaging portion on the first coupling member;

a plurality of annular friction disks mounted on the brake engaging portion, the friction disks being circumferentially locked to the first coupling member but free to slide longitudinally;

a plurality of annular brake plates interleaved with the friction disks, the brake plates being circumferentially locked to a stationary portion of the gear housing but free to slide longitudinally;

a selectively engagable brake actuator mounted on the gear housing which, when engaged, forces the friction disks longitudinally against the brake plates to prevent relative rotational motion between the first coupling member and the gear housing and, when not engaged, allows relative motion between the first coupling member and the gear housing.

11. A gearbox with transmitted torque sensor comprising:

a housing defining a longitudinal axis;

an input coupling member mounted in the housing for rotation about the longitudinal axis, the input coupling member having a first engaging portion adapted for receiving torque from an input shaft, and having a first axial face;

an output coupling member mounted in the housing for rotation about the longitudinal axis, the output coupling member having a second engaging portion adapted for transmitting torque to a first gearbox shaft, and having a second axial face;

the axial faces being disposed in a spaced apart, opposing relationship to one another, and having a plurality of spaced apart conical seats provided therein arranged in opposing pairs;

at least one of the coupling members being adapted for translation along the longitudinal axis relative to the other coupling member;

a ball disposed in each opposing pair of conical seats between the input coupling member and the output coupling member;

a sensing assembly positioned between the housing and at least one of coupling members such that a longitudinal movement of the coupling members relative to one another produces a resulting movement in the sensing assembly;

a first gear disposed on the first gearbox shaft for receiving torque therefrom;

a second gear operatively engaging the first gear for receiving torque therefrom and transmitting torque to an output shaft;

wherein the balls roll partway up the conical seats when transmitting torque between the input and output coupling members, thereby causing the coupling members to move axially away from one another a distance substantially proportional to a torque transmitted between the input and output shafts, whereby the torque transmitted is indicated by the resulting movement in the sensing assembly.

12. A gearbox in accordance with claim 11, wherein the sensing assembly further comprises:

a sensing piston slidably mounted in the housing and interfitting with a stationary portion of the housing to form a hydraulic chamber therebetween, the piston being in mechanical communication with one of the coupling members such that the resulting movement of the piston causes a corresponding change in the pressure in the hydraulic chamber indicative of the longitudinal movement between the coupling members;

a pressure sensor operably connected to the hydraulic chamber for indicating the pressure of the hydraulic fluid; and whereby the torque transmitted by the gearbox is indicated by the hydraulic pressure sensed by the pressure sensor.

13. A planetary gearbox in accordance with claim 12, wherein the sensor piston has an annular configuration and the cavity formed between the sensor piston and the gear housing is an annular cavity encircling the longitudinal axis.

14. A gearbox in accordance with claim 11, wherein the sensing assembly further comprises:

a load transfer member slidably mounted in the housing between a fixed portion of the housing and one of the coupling members, the load transfer member moving in response to longitudinal movement of the coupling members with respect to one another;

a load cell mounted between the fixed portion of the housing and the load transfer member, the load cell having a resilience and being deformed by movement of the load transfer member and producing an electrical signal indicative of the magnitude of the movement;

wherein the resilience of the load cell urges the load transfer member toward one of the coupling members, and relative longitudinal movement of the coupling members with respect to one another results in a corresponding movement of the load transfer member that can be detected by the load cell to indicate transmitted torque.

15. A gearbox in accordance with claim 14, wherein the load cell is an annular strain gauge load cell.

16. A gearbox in accordance with claim 11, wherein at least one of the first and second engaging portions comprises longitudinal ball splines including a plurality of balls and correspondingly shaped longitudinal splines for reducing friction when the respective coupling member moves in the longitudinal direction.

17. A gearbox in accordance with claim 11, further comprising:

a brake engaging portion on the input coupling member;

a plurality of annular friction disks mounted on the brake engaging portion, the friction disks being circumferentially locked to the input coupling member but free to slide longitudinally;

a plurality of annular brake plates interleaved with the friction disks, the brake plates being circumferentially locked to a stationary portion of the housing but free to slide longitudinally;

a selectively engagable brake actuator mounted on the housing which, when engaged, forces the friction disks longitudinally against the brake plates to prevent relative rotational motion between the input coupling member and the housing and, when not engaged, allows relative motion between the input coupling member and the housing.

18. A torque sensor for sensing the torque transmitted by a gearbox, the sensor comprising:

a first coupling member for mounting in the gearbox for rotation about a longitudinal axis, having a first engaging portion adapted for receiving torque from an input shaft and having a first axial face;

a second coupling member for mounting in the gearbox for rotation about the longitudinal axis, having a second engaging portion adapted for transmitting torque to an output shaft and having a second axial face;

the first and second axial faces being disposed in a spaced apart, opposing relationship to one another, and having a plurality of spaced apart conical seats provided therein arranged in opposing pairs;

at least one of the coupling members being adapted for axial translation along the longitudinal axis relative to the other coupling member;

a ball disposed in each opposing pair of conical seats between the first coupling member and the second coupling member;

a sensing assembly operatively connected to only one of the coupling members, the sensing assembly urging the connected coupling member toward the other coupling member and detecting longitudinal movement of the connected coupling member relative to the other coupling member;

wherein the balls roll partway up the conical seats when transmitting torque between the first and second coupling members, thereby causing the coupling members to move longitudinally away from one another a distance substantially proportional to a torque transmitted between the input shaft and the output shaft, the distance being detected by the sensing assembly and being indicative of the torque transmitted.

19. A torque sensor in accordance with claim 18, wherein the sensing assembly further comprises:

a hydraulic reservoir including a movable actuator portion;

the actuator portion being operatively connected to the connected coupling member so as to change position in response to longitudinal movement of the connected coupling member;

the reservoir having a volume that varies according to the position of the actuator portion;

a quantity of hydraulic fluid contained within the hydraulic reservoir, the pressure of the hydraulic fluid changing according to the volume of the cavity;

a pressure sensor operably connected to the reservoir for measuring the pressure of the hydraulic fluid; and wherein relative longitudinal movement of the connected coupling member with respect to the other coupling member results in a corresponding change in the pressure of the hydraulic fluid that can be detected by the pressure sensor to indicate transmitted torque.

20. A torque sensor in accordance with claim 18, wherein the sensing assembly further comprises:

a load transfer member operatively connected to the connected coupling member, the load transfer member moving in response to longitudinal movement of the coupling members with respect to one another;

a load cell that is deformed by movement of the load transfer member and produces an electrical signal indicative of the magnitude of the deformation;

wherein relative axial movement of the coupling members with respect to one another results in a corresponding movement of the load transfer member that can be detected by the load cell to produce an electrical signal indicative of transmitted torque.

21. A load sensor for sensing a load on a boom mounted to a vehicle, comprising:

a boom operatively coupled to a vehicle;

a gear train for rotating the boom relative to the vehicle, the gear train including an input coupling member for rotation about a longitudinal axis, the input coupling member having a first engaging portion adapted for receiving torque from a power source shaft, and having a first axial face;

an output coupling member for rotation about the longitudinal axis, the output coupling member having a second engaging portion adapted for transmitting torque to a first gearbox shaft, and having a second axial face, the axial faces being disposed in a spaced apart, opposing relationship to one another, and having a plurality of spaced apart conical seats provided therein arranged in opposing pairs;

at least one of the coupling members being adapted for translation along the longitudinal axis relative to the other coupling member;

a ball disposed in each opposing pair of conical seats between the input coupling member and the output coupling member;

a gear set for receiving the torque from the first gearbox shaft and transmitting the torque to the boom;

a gear housing mounted to the vehicle for containing the gear train, the gear housing including a sensing assembly positioned between a stationary portion of the gear housing and at least one of coupling members such that a longitudinal movement of the coupling members relative to one another produces a resulting movement in the sensing assembly;

wherein the balls roll partway up the conical seats while transmitting torque between the input and output coupling members, thereby causing the coupling members to move longitudinally away from one another a distance substantially proportional to a torque transmitted between the power source shaft and the boom, and the distance of the resulting movement in the sensing assembly is indicative of the torque load on the boom.

22. A load sensor in accordance with claim 21, wherein the gear set includes at least one stage of planetary gears.

23. A load sensor in accordance with claim 21, wherein the sensing assembly further comprises:

a sensing piston slidably mounted in the housing and interfitting with a stationary portion of the housing to form a hydraulic chamber therebetween, the piston being in mechanical communication with one of the coupling members such that the resulting movement of the piston causes a corresponding change in the pressure in the hydraulic chamber indicative of the longitudinal movement between the coupling members;

a pressure sensor operably connected to the hydraulic chamber for indicating the pressure of the hydraulic fluid; and whereby the torque load on the boom is indicated by the hydraulic pressure sensed by the pressure sensor.

24. A load sensor in accordance with claim 23, wherein the sensor piston has an annular configuration and the cavity formed between the sensor piston and the gear housing is an annular cavity encircling the longitudinal axis.

25. A load sensor in accordance with claim 21, wherein the sensing assembly further comprises:

a load transfer member slidably mounted in the housing between a fixed portion of the housing and one of the coupling members, the load transfer member moving in response to longitudinal movement of the coupling members with respect to one another;

a load cell mounted between the fixed portion of the housing and the load transfer member, the load cell having a resilience and being deformed by movement of the load transfer member and producing an electrical signal indicative of the magnitude of the movement;

wherein the resilience of the load cell urges the load transfer member toward one of the coupling members, and relative longitudinal movement of the coupling members with respect to one another results in a corresponding movement of the load transfer member that can be detected by the load cell to indicate the torque load on the boom.

26. A load sensor in accordance with claim 25, wherein the load cell is an annular strain gauge load cell.

27. A load sensor in accordance with claim 21, further comprising:

a brake engaging portion on the input coupling member;

a plurality of annular friction disks mounted on the brake engaging portion, the friction disks being circumferentially locked to the input coupling member but free to slide longitudinally;

a plurality of annular brake plates interleaved with the friction disks, the brake plates being circumferentially locked to a stationary portion of the gear housing but free to slide longitudinally;

a selectively engagable brake actuator mounted on the gear housing which, when engaged, forces the friction disks longitudinally against the brake plates to prevent relative rotational motion between the input coupling member and the gear housing and, when not engaged, allows relative motion between the input coupling member and the gear housing.

* * * * *